United States Patent [19]

Kim

[11] Patent Number: 5,478,886
[45] Date of Patent: Dec. 26, 1995

[54] ACRYLIC BLOCK COPOLYMERS

[75] Inventor: Young H. Kim, Hockessin, Del.

[73] Assignee: E. I. Du Pont de Nemours and Company, Wilmington, Del.

[21] Appl. No.: 381,794

[22] Filed: Feb. 1, 1995

[51] Int. Cl.$^6$ .......................... C08F 20/29; C08F 14/18
[52] U.S. Cl. ............... 525/94; 525/276; 525/288
[58] Field of Search ................... 525/276, 288, 525/94

[56] References Cited

U.S. PATENT DOCUMENTS

| | | | |
|---|---|---|---|
| 3,407,247 | 10/1968 | Reinhardt | 525/276 X |
| 4,644,043 | 2/1987 | Ohmori et al. | 526/246 |
| 4,665,144 | 5/1987 | Ohmori et al. | 526/245 |
| 4,690,869 | 9/1987 | Ohmori et al. | 428/421 |
| 4,871,820 | 10/1989 | Ohmori et al. | 526/245 |
| 5,026,621 | 6/1991 | Tsubuko | 430/109 |
| 5,049,622 | 9/1991 | Abe | 525/267 |
| 5,399,620 | 3/1995 | Niessner | 525/71 |

FOREIGN PATENT DOCUMENTS

| | | | |
|---|---|---|---|
| 033083 | 9/1989 | European Pat. Off. | D06M 15/277 |
| 3086708 | 4/1988 | Japan | |

OTHER PUBLICATIONS

Boguslavskaya, L. S. et al, "α-Fluoroacrylates: synthesis, properties and use", *Russian Chemical Reviews*, 59(9), 906–917 (1990).

Narita, T. et al, "Anionic polymerization of fluorine-containing vinyl monomers. 11. α-Fluoroacrylates", *J. of Fluorine Chemistry*, 61, 239–246 (1993).

Primary Examiner—Joseph L. Schofer
Assistant Examiner—I. Zemel

[57] ABSTRACT

Disclosed herein are block copolymers in which one the repeat units in one type of block is derived from (meth-)acrylate esters, and repeat units in a second type of block are derived from α-fluoroacrylate esters. Also described is a process for making these block copolymers by Group Transfer Polymerization. The block copolymers are useful as for stabilizing emulsions and suspensions and for modifying the surface properties of objects.

7 Claims, No Drawings

ACRYLIC BLOCK COPOLYMERS

FIELD OF THE INVENTION

This invention concerns novel block copolymers containing at least one block of a (meth)acrylic ester and at least one block of an α-fluoroacrylate ester, as well as a process for making such polymers by Group Transfer Polymerization.

TECHNICAL BACKGROUND

Block copolymers such as those disclosed herein are useful as emulsifiers or stabilizers for dispersions or for modifying the surface properties of objects such as polymers, particularly acrylic based polymers. Random copolymers of α-fluoroacrylates and (meth)acrylates are known, see for instance L. S. Boguslavskaya, et al., Uspekhi Khemii, vol. 59, p. 1555–1575 (1990) [translation Rus. Chem. Rev., vol. 59, p. 906–917 (1990)]. However, this review article does not report any block copolymers. Group Transfer Polymerization (GTP) is a well known polymerization technique, see for instance, O. W. Webster, et al., "Group Transfer Polymerization" in "New Methods for Polymer Synthesis", W. J. Mijs, Ed., Plenum Press, New York, 1992, p. 1–32, but the polymerization of α-fluoroacrylate esters by GTP has not been reported.

U.S. Pat. Nos. 4,644,043, 4,665,144 and 4,871,820 describe copolymers of α-fluoroacrylate esters. None of these polymers are block copolymers.

T. Narita, et al., J. Fluorine Chem., vol. 61, p. 239–246 (1993) describe the anionic polymerization of α-fluoroacrylate esters to form homopolymers.

SUMMARY OF THE INVENTION

This invention concerns a block copolymer, consisting essentially of:

at least one first polymer block which consists essentially of repeat units which are derived from one or more esters of acrylic or methacrylic acid, or one or more esters of acrylic acid and methacrylic acid; and at least one second polymer block which consists essentially of repeat units which are derived from one or more esters of α-fluoroacrylic acid;

and provided that said second polymer block has a degree of polymerization of 3 to about 50.

This invention also concerns a process for production of a block copolymer by Group Transfer Polymerization, comprising, contacting under Group Transfer Polymerization conditions a polymer of the formula

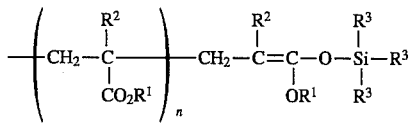
(I)

with an α-fluoroacrylate ester, wherein:

n is an integer of 2 or more;

each $R^1$ is independently hydrocarbyl or substituted hydrocarbyl;

each $R^2$ is independently hydrogen or methyl; and each $R^3$ is independently a univalent radical which does not interfere with Group Transfer Polymerization.

DETAILS OF THE INVENTION

The repeat units of the first polymer block herein are derived from esters of (meth) acrylic (indicating either acrylic or methacrylic) acid, and have the usual formula $CH_2=CR^2CO_2R^1$, wherein $R^2$ is hydrogen or methyl and $R^1$ is hydrocarbyl or substituted hydrocarbyl. By hydrocarbyl herein is meant a univalent radical containing only carbon and hydrogen, while by substituted hydrocarbyl is meant a univalent radical containing carbon and hydrogen and one or more substituents which do not interfere with the formation of the block copolymer by GTP. In the (meth)acrylic esters it is preferred if the ester is an ester of methacrylic acid ($R^2$ is methyl), and in other esters it is also preferred if the ester is derived from an aliphatic alcohol ($R^1$ is alkyl, and the alcohol is $R^1OH$) containing less than 20 carbon atoms, and it is more preferred if that alcohol contains 4 or less carbon atoms, and especially preferred if it is methyl or ethyl alcohol ($R^1$ has 1 or 2 carbon atoms). Such esters are common items of commerce.

The repeat units of the second polymer block are derived from an ester of α-fluoroacrylic acid, and may have the formula $CH_2=CFCO_2R^1$ wherein the groups for $R^1$ are as defined above (including preferred groups for $R^1$). Such esters can be made by methods known to the artisan, see for instance L. S. Boguslavskaya, et al., supra, and references cited therein.

In the block copolymer the repeat units in the first block are those normally derived from the GTP of (meth)acrylate esters and have the general formula —$CH_2$—$CR^2(CO_2R^1)$— wherein $R^1$ and $R^2$ and their preferred structures are as defined above. Similarly the repeat units of the second block are —$CH_2$—$CF(CO_2R^1)$—, wherein $R^1$ and its preferred structures are as defined above. There may be one or more of each of the first and second polymer block in the block copolymer, but it is preferred if there is one block of each. It is preferred if the degree of polymerization of the first block is 3 to about 500. By degree of polymerization is meant the average number of repeat units in that block. The degree of polymerization of the second block is 3 to about 50, preferably about 5 to about 25.

It is most convenient to make the block copolymer described herein by GTP. The poly(meth)acrylate ester block (first block) can be made by contacting a (meth)acrylate ester with a silyl ketene acetal of the formula

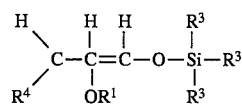

wherein $R^4$ is hydrocarbyl or substituted hydrocarbyl and each $R^3$ is independently a univalent radical which does not interfere with Group Transfer Polymerization. It is preferred if $R^4$ is alkyl and especially preferred if it is methyl. It is preferred if each $R^3$ is siloxy or hydrocarbyl, more preferred if it is alkyl containing up to 20 carbon atoms or phenyl, and especially preferred if it is methyl. This produces a polymer with a "living end" (an end that can cause further polymerization) with the formula

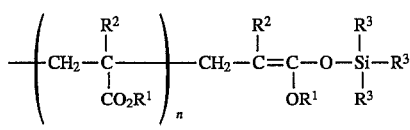

The open bond on the end of this polymer is derived from the GTP initiator, and may be termed "Z". It is preferred if n is 2 to about 1000, more preferred if n is 2 to about 500. In turn, this living ended polymer is contacted with an α-fluoroacrylate ester to form the corresponding polymer block (second block). It is important to form the first block before the second block when using GTP, since a block copolymer is not made if the α-fluoroacrylate is polymerized first, and then a (meth)acrylate ester is added (in fact no polymer based on (meth)acrylate ester is formed at all). Therefore the first block(s) will be formed before the second block(s) when using GTP. Polymers containing more than one of the first and/or second blocks can be made by judicious selection of difunctional silyl ketene acetals as initiators and other similar technology known in GTP.

These polymerizations are done under typical GTP conditions. Such conditions are known to the artisan, and may be found in O. W. Webster, et al., "Group Transfer Polymerization" in "New Methods for Polymer Synthesis", W. J. Mijs, Ed., Plenum Press, New York, 1992, p. 1–32, which is hereby included by reference, and in references cited therein. For instance, the polymerizations may be done in the liquid phase with or without solvent, but preferably with solvent. Normally compounds containing active hydrogen atoms, such as water, alcohols, and primary amines, and functional groups such as hydroxyl groups and primary amines should be excluded from the polymerization. Typical polymerization temperatures are about 0° C. to about 0° C. In GTP a catalyst is often present, such as a compound that is a source of bifluoride anion or a suitable oxyanion. All of these items (and others) are considered herein to be typical of GTP conditions.

In the Examples, the following abbreviations are used:

BDS—bis(dimethylamino)methylsilane

D—polydispersity, weight average molecular weight/ number average molecular weight EFA—ethyl α-fluoroacrylate GPC—gel permeation chromatography MMA—methyl methacrylate Mn—number average molecular weight PMMA—poly(methyl methacrylate)

THF—tetrahydrofuran

EXAMPLE 1

Block Copolymer of PMMA and Ethyl α-Fluoroacrylate

The ethyl α-fluoroacrylate monomer purity was over by gas chromatography. Prior to the polymerization, ethyl α-fluoroacrylate (EFA) was filtered through neutral alumina, then treated with a small amount of scavenger, bis(dimethylamino)methylsilane (for 2.0 mL of monomer, 5 drops of the scavenger). To 6 mL of dry THF was added 342 μl of 2-methoxy, 3-methyl, 1-trimethylsiloxy propene (MTPS) and 100 μl of a 0.1M tetrabutyl ammonium metachlorobenzoate solution in acetonitrile in a small portion for 4 min. The temperature of the solution rose from 22.5° C. to 51.8° C. during this period. The solution was cooled to 44° C., and then 2.0 mL (1.85 g) of ethyl α-fluoroacrylate was added at once which caused the temperature of the solution to rise to 64.6° C. The solvent was removed, and 3.53 g of crusty slightly yellow solid was obtained. NMR showed the mole ratio between MMA and EFA was 1:0.8. GPC analysis showed that Mn=1510, D=1.55.

EXAMPLE 2

A PMMA EFA block copolymer was made by the same method as in Example 1, except no bis(dimethylamino)methylsilane was used. The isolated yield of polymer of 2.59 g. The molar ratio of MMA:EFA by HNMR was 1:0.3, the Mn was 1180 and D was 1.46.

EXAMPLE 3

Thin films of homopolymer of PMMA and poly(ethyl α-fluoroacrylate), and the copolymer of Example 1 were prepared on silicon wafers, through a Langmuir-Blodgett deposition method. Thin films of homopolymer of PMMA (GTP polymer) and PEFA (free radical polymer) and their copolymer were prepared on silicon wafers, through a Langmuir-Blodgett deposition method. The thickness of films were in the order of 100 Å. The advancing water contact angles of these films, after annealing at 140° C. overnight, was 108° for homo PEFA, 59° for homo PMMA (DP=10), and 74° for the PMMA-PEFA block copolymer.

What is claimed is:

1. A block copolymer, consisting essentially of:

at least one first polymer block which consists essentially of repeat units which are derived from one or more esters of acrylic or methacrylic acid, or one or more esters of acrylic acid and methacrylic acid; and at least one second polymer block which consists essentially of repeat units which are derived from one or more esters of α-fluoroacrylic acid;

and provided that said second polymer block has a degree of polymerization of 3 to about 50.

2. The block copolymer as recited in claim 1 wherein there is one said first block and one said second block.

3. The block copolymer as recited in claim 2 wherein said ester from which said first block is derived is an ester of methacrylic acid.

4. The block copolymer as recited in claim 2 wherein said esters, from which said first and second blocks are derived, are esters of an alcohol $R^1OH$, wherein each $R^1$ is independently alkyl containing up to about 20 carbon atoms.

5. The block copolymer as recited in claim 4 wherein each $R^1$ independently contains 1 to 4 carbon atoms.

6. The block copolymer as recited in claim 5 wherein each $R^1$ independently contains 1 or 2 carbon atoms.

7. The block copolymer as recited in claim 1 wherein said first block has a degree of polymerization of 3 to about 500, and said second block has a degree of polymerization of about 5 to about 25.

* * * * *